May 13, 1958  H. A. BERTRAND  2,834,609
PASSENGER SAFETY DEVICE FOR VEHICLES
Filed Nov. 5, 1956
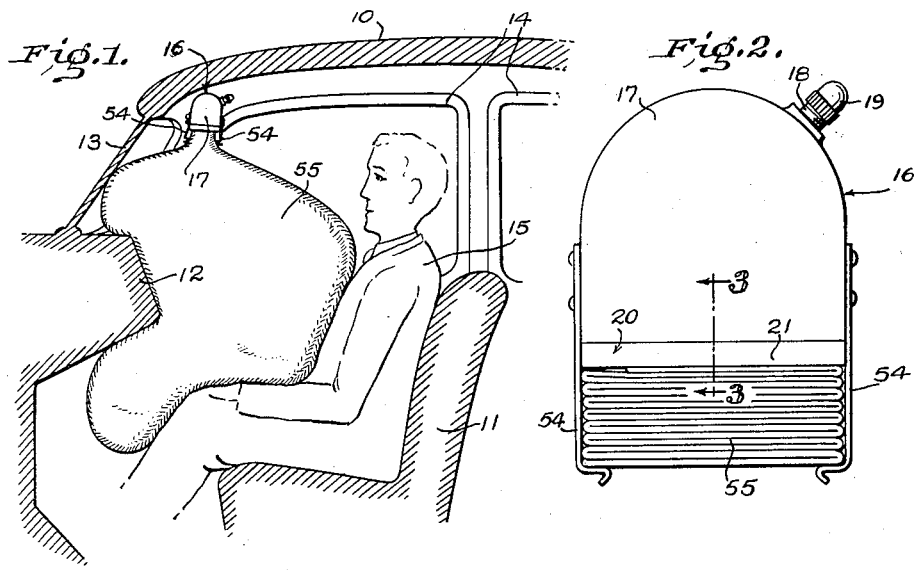
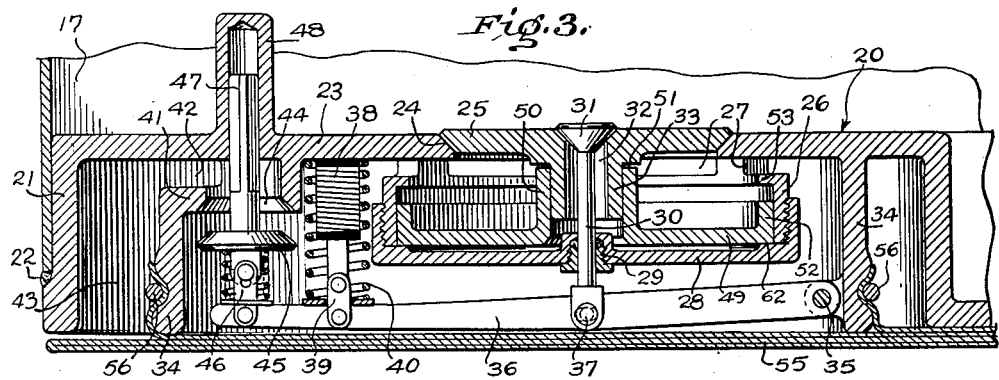
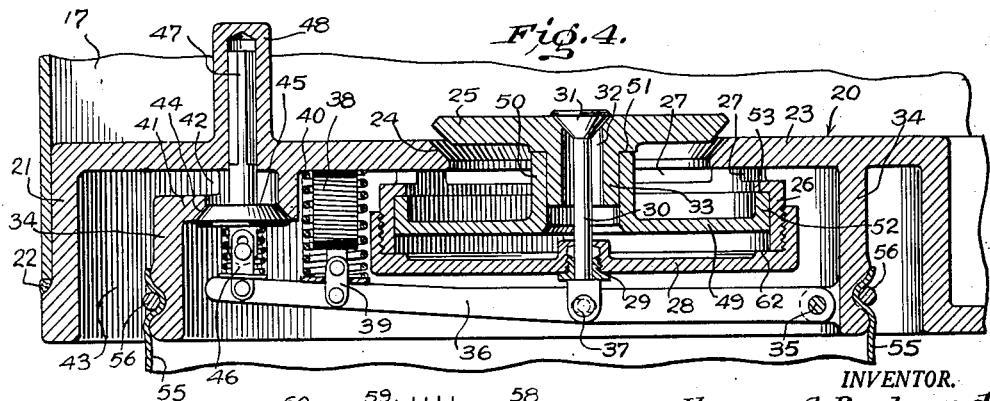
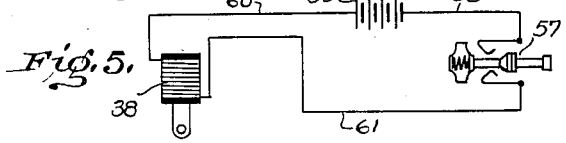
INVENTOR.
Harry A. Bertrand
BY Reginald W. Hoagland
ATTORNEY

United States Patent Office 2,834,609
Patented May 13, 1958

2,834,609
PASSENGER SAFETY DEVICE FOR VEHICLES
Harry A. Bertrand, Flint, Mich.

Application November 5, 1956, Serial No. 620,312

8 Claims. (Cl. 280—150)

The present invention comprises an improvement over my pending application Serial No. 538,748, filed October 5, 1955, and it consists in the combinations, constructions and arrangements of parts herein described and claimed.

Generally the present invention relates to a device, numbers of which may be mounted at convenient positions within a vehicle such as a motor vehicle and each of which consists of a casing within which is mounted a high pressure tank adapted to contain air under very high pressure and a novel bracket in which is compactly folded and held an inflatable bag. A novel valve arrangement is provided whereby the bag may be quickly and easily inflated to take its position between a passager in the vehicle and the various solid portions of the vehicle which the passenger would normally come into violent contact in the case of a collision. The device may be set in motion by the simple closing of a switch convenient to the operator of the vehicle and novel means is provided for deflating the bag immediately after it has served its purpose whereby to eliminate any danger whatever of smothering the passengers with whom the inflated bag has come into contact.

It is accordingly an object of the invention to provide a novel safety device for vehicle passengers.

Still another object of the invention is to provide, in a device of the character set forth, a novel remotely controlled inflating valve.

Another object of the invention is to provide, in a device of the character set forth, a novel shut off valve automatically operable by the aforesaid inflating valve.

Still another object of the invention is to provide means for automatically opening the shut off valve after a bag, forming a part of the invention, has been fully inflated.

Still another and important object of the invention is the provision of a pilot valve for effecting the opening of the inflating valve.

Other and further objects of the invention will become apparent from a reading of the following specification taken in conjunction with the drawing, in which:

Figure 1 is a fragmentary longitudinal sectional view of a vehicle having an embodiment of the present invention mounted therein and showing an inflatable bag, forming part of the invention, in inflated condition, Figure 2 is an enlarged end elevational view of the device embodying the present invention showing the same in inoperative condition, Figure 3 is a further enlarged fragmentary sectional view taken substantially along line 3—3 of Figure 2 and showing the device in inactive condition, Figure 4 is a view similar to Figure 3 but showing the device as it would appear during inflation of the aforesaid bag, and Figure 5 is a schematic view illustrating an electrical circuit utilized in the invention.

Referring more particularly to the drawing, there is shown therein a vehicle 10 provided with a seat 11, an instrument panel 12, a windshield 13 and doors 14. There is shown at 15 a passenger seated in the seat 11 and immediately above the windshield 13 there is affixed to the roof of the vehicle in any suitable manner a device embodying the present invention and generally indicated at 16.

The device 16 comprises a high pressure tank 17 adapted to contain air under high pressure and provided with a conventional filler opening 18 and cap 19.

A valve structure generally indicated at 20 is provided with a frame 21 which is affixed within the lower end of the tank 17 in any suitable manner as by welding 22. The frame is provided with a closed top 23 which is provided with a relatively large opening 24 in which is normally seated an inflating valve 25.

Extending downwardly from the underside of the wall 23 is a cylindrical member 26 provided at its upper end with a series of circumferentially spaced openings 27. The cylindrical member 26 has threadably connected to its lower end a bottom cover 28 in which is centrally mounted a bushing 29 through which vertically extends the stem 30 of a pilot valve 31 which is seated at the upper end of a centrally disposed passageway 32 in the valve 25. The passageway 32 continues downwardly through a cylindrical dependent portion 33 of the valve 25.

A housing 34 is integrally dependent from the wall 23, is open at its bottom and surrounds the moving portions of the valve structure 20. Pivotally connected, as indicated at 35, to the inner wall of the housing 34 is a lever 36 and the lower end of the stem 30 is pivoted to the lever 36 as indicated at 37. A solenoid 38 is affixed to the underside of the wall 23 and is connected by a link 39 to the lever 36 in spaced relation to the outer end thereof and a compression spring 40 surrounds the solenoid and bears against the underside of the wall 23 and the upper side of the lever 36.

The housing 34 is provided with a foreshortened upper wall 41 at one side thereof providing a space 42 between the same and the underside of the wall 23. This space 42 connects with a passageway 43 which, in turn, connects with the atmosphere. In the wall 41, there is provided an opening 44 in which a valve 45 is adapted to seat. The valve 45 is connected to the outer end portion of the lever 36 by a link 46 and is provided with an upwardly extending guide member 47 which is slidably mounted in an upwardly extending guide housing 48 formed integrally with the upper side of the wall 23.

A pistonlike member 49, slidable in the cylindrical member 26 is provided with a cylindrical inner wall 50 which is slidable upon the extension 33 and is adapted to abut a shoulder 51 formed on the underside of the valve 25. Likewise, an outer wall 52, also on the pistonlike member is adapted to abut against a shoulder 53 formed adjacent the upper end of the member 26 and below said openings 27.

Affixed to the casing 17 is a plurality of dependent resilient bracket members 54 which are adapted to hold in folded condition an inflatable bag 55, as illustrated in Figures 2 and 3, the bag 55 being affixed upon the outer side of the housing 34 by means of a wire 56 or the like. To complete the device, there is provided a time delay switch 57 which may be mounted in any convenient position as, for example, upon the instrument panel 12 and which is attached by a wire 58 to a source of electrical energy 59 which is, in turn, connected by a wire 60 to the solenoid 38, a return wire 61 connecting the solenoid with the switch 57.

In operation, it will be apparent that when a collision is imminent and unavoidable in the judgment of the operator of the vehicle 10, in order to protect himself and his passengers from the ordinary effects of such collision wherein the bodies of the passengers and the driver are hurled against objects such as the instrument panel 12, the windshield 13, doors 14 or the like, it is only necessary for the operator to close the switch 57, thus energizing the solenoid 38. This action will move the lever 36 in a clockwise direction as viewed in Figures 3 and 4 pivoting the same upon the pivotal point 35. This action will lift the pilot valve 31 from its seat thus permitting the compressed air in the tank 17 to enter the passageway 32 whence it will be led to the underside of the member 49, the latter being normally spaced from the bottom of the member 28 by a shoulder 62 to thereby lift the member 49 which action will bring the member 50 into contact with the shoulder 51 of the valve 25 thereby opening the valve 25 and permitting an immediate outrush of air from the tank 17 through the openings 27 and thence into the bag 55 to quickly inflate the same and thereby protect the operator and passengers from the normal effects of a collision. During upward movement of the lever 36 to open the pilot valve 31 and prior to the opening of the valve 25, said lever moves the valve 45 into engagement with its seat at the opening 44 and thus prevents air, entering the bag 55, from escaping to the atmosphere. It will be apparent that if the valve 25 were not provided with the relatively small pilot valve 31, a great deal of pressure would be necessary to open the same. In the present instance, however, the high pressure within the tank 17 acts to lift the valve 25 from its seat to the position shown in Figure 4 to then permit the outrush of air, as above set forth. After a predetermined amount of time has elapsed and inflation of the bag 55 is no longer required, the time delay switch 57 opens the circuit to the solenoid 38, whereupon the spring 40 will act to move the lever 36 in a downward or counterclockwise direction as viewed in Figures 3 and 4 moving the various component parts to their position shown in Figure 3 and thus opening the valve 45 and permitting the air which was entrapped in the bag 55 to escape through the passage 42—43 to the atmosphere, thus relieving any pressure upon the persons protected during the actual collision and relieving them immediately of any danger of becoming smothered by such bag if the same were allowed to remain in an inflated condition.

While but one form of the invention has been shown and described herein, it will be readily apparent to those skilled in the art that many minor modifications may be made without departing from the spirit of the invention or the scope of the appended claims.

What is claimed is:

1. A device of the character described comprising an air pressure tank, an inflatable bag attached to said tank, a relatively large inflating valve interconnecting the tank and bag, and means operable by the pressure of air in said tank to open said inflating valve, said means including a cylinder mounted beneath said inflating valve exteriorly of said tank and having a plurality of relatively large openings therein communicating with the interior of said bag, a piston-like member that abuts said inflating valve when in raised condition, said inflating valve having a passageway therethrough communicating said tank with the space between the bottom of the cylinder and said piston-like member, a pilot valve seated at the upper end of said passageway, a stem for said pilot valve extending through said passageway and through the bottom of the cylinder, and means for opening said pilot valve.

2. A device as defined in claim 1 wherein said last-named means includes a lever pivotally connected to the lower end of said pilot valve stem, a solenoid connected to said lever, and remotely controlled electrical means for actuating said solenoid.

3. A device as defined in claim 2 wherein means is provided for relieving air pressure in said bag after a predetermined amount of time has elapsed since inflation of said bag.

4. A device as defined in claim 2 wherein means is provided for relieving air pressure in said bag after a predetermined amount of time has elapsed since inflation of said bag, said means comprising a passageway interconnecting the interior of said bag with the atmosphere, a valve connected to the free end of said lever and seated in said passageway, and a compression spring associated with said solenoid and adapted to urge said lever to its initial position upon de-energizing of said solenoid whereby to open said last-mentioned valve.

5. A device of the character described comprising an air pressure tank, an inflatable bag attached to said tank, a relatively large inflating valve interconnecting the tank and bag, and means operable by the pressure of air in said tank to open said inflating valve, said means including a cylinder mounted beneath said inflating valve exteriorly of said tank and having a plurality of relatively large openings therein communicating with the interior of said bag, a centrally dependent portion on said inflating valve extending into said cylinder, a piston-like member surrounding said dependent portion and having an inner wall slidable on said dependent portion and adapted to abut said inflating valve when in raised condition, said inflating valve and its dependent portion having a passageway therethrough communicating the tank with the space between the bottom of the cylinder and said piston-like member, a pilot valve seated at the upper end of said passageway, a stem for said pilot valve extending through said passageway and through the bottom of the cylinder, and means for opening said pilot valve.

6. A device of the character described comprising an air pressure tank, an inflatable bag attached to said tank, a relatively large inflating valve interconnecting the tank and bag, and means operable by the pressure of air in said tank to open said inflating valve, said means including a cylinder mounted beneath said inflating valve exteriorly of said tank and having a plurality of relatively large openings in the upper end thereof communicating with the interior of said bag, a centrally dependent portion on said inflating valve extending into said cylinder, a piston-like member surrounding said dependent portion and having an inner wall slidable on said dependent portion and adapted to abut said inflating valve when in raised condition, a shoulder in the lower end of said cylinder for limiting downward movement of said piston-like member, said inflating valve and its dependent portion having a passageway therethrough communicating with the space between the bottom of the cylinder and said piston-like member, a relatively short outer wall for said piston-like member slidable upon the inner wall of said cylinder, a shoulder in said cylinder for limiting the upward movement of said piston-like member, a pilot valve seated at the upper end of said passageway, a stem for said pilot valve extending through said passageway and through the bottom of the cylinder, and means for opening said pilot valve.

7. A device as defined in claim 6 wherein said last-named means includes a lever pivotally connected to the lower end of said pilot valve stem, a solenoid connected to said lever, and remotely controlled electrical means for actuating said solenoid.

8. A device as defined in claim 7 wherein means is provided for relieving air pressure in said bag after a predetermined amount of time has elapsed since inflation of said bag, said means comprising a passageway interconnecting the interior of said bag with the atmosphere, a valve connected to the free end of said lever and seated in said passageway, and a compression spring associated with said solenoid and adapted to urge said lever downwardly to its initial position upon de-energizing of said solenoid whereby to open said last-mentioned valve.

References Cited in the file of this patent

UNITED STATES PATENTS

| | | |
|---|---|---|
| 209,503 | Murdock | Oct. 29, 1878 |
| 1,132,886 | Stewart | Mar. 23, 1915 |
| 1,675,957 | Reeves | July 3, 1928 |
| 1,894,267 | Foresman | Jan. 17, 1933 |
| 2,649,311 | Hetrick | Aug. 18, 1953 |
| 2,755,125 | Hodges | July 17, 1956 |

FOREIGN PATENTS

| | | |
|---|---|---|
| 896,312 | Germany | Nov. 12, 1953 |